US007651550B2

(12) United States Patent
Hawes et al.

(10) Patent No.: US 7,651,550 B2
(45) Date of Patent: Jan. 26, 2010

(54) METHOD FOR SULFUR COMPOUNDS REMOVAL FROM CONTAMINATED GAS AND LIQUID STREAMS

(75) Inventors: Peter Hawes, Uerikon (CH); Andreas Scheuble, Meilen (CH); Beat Kleeb, Uetikon (CH); Armin Pfenninger, Uetikon (CH)

(73) Assignee: Zeochem AG (CH)

( * ) Notice: Subject to any disclaimer, the term of this patent is extended or adjusted under 35 U.S.C. 154(b) by 353 days.

(21) Appl. No.: 10/559,734

(22) PCT Filed: Jun. 6, 2003

(86) PCT No.: PCT/IB03/02541

§ 371 (c)(1),
(2), (4) Date: Feb. 15, 2007

(87) PCT Pub. No.: WO2004/108273

PCT Pub. Date: Dec. 16, 2004

(65) Prior Publication Data
US 2007/0193939 A1 Aug. 23, 2007

(51) Int. Cl.
B01J 20/18 (2006.01)
B01J 20/34 (2006.01)
B01D 53/04 (2006.01)

(52) U.S. Cl. .............................. 95/135; 95/141; 95/148; 210/690; 423/242.1; 585/820; 585/826

(58) Field of Classification Search .................. 95/135, 95/141, 148, 900, 902; 96/153; 210/690–691; 423/242.1, 244.01, 244.11, DIG. 21; 502/79, 502/439; 585/820, 826
See application file for complete search history.

(56) References Cited

U.S. PATENT DOCUMENTS

| | | | |
|---|---|---|---|
| 2,882,243 A | 4/1959 | Milton et al. | |
| 2,882,244 A | 4/1959 | Milton et al. | |
| 3,760,029 A | 9/1973 | McCoy | |
| 3,816,975 A | 6/1974 | Collins | |
| 4,098,684 A | 7/1978 | Innes | |
| 4,243,556 A * | 1/1981 | Blanton, Jr. | 502/64 |
| 4,358,297 A | 11/1982 | Eberly, Jr. | |
| 4,404,118 A | 9/1983 | Herskovits | |
| 4,465,780 A * | 8/1984 | Pine | 502/68 |
| 4,540,842 A | 9/1985 | Allen | |
| 4,795,545 A | 1/1989 | Schmidt | |
| 5,057,473 A | 10/1991 | Voecks et al. | |
| 5,110,776 A | 5/1992 | Chitnis et al. | |
| 5,231,064 A | 7/1993 | Absil et al. | |
| 5,378,670 A * | 1/1995 | Kumar | 502/60 |
| 5,576,258 A * | 11/1996 | Chamberlain et al. | 502/73 |
| 5,843,300 A | 12/1998 | Zinnen et al. | |
| 6,096,194 A | 8/2000 | Tsybulevskiy et al. | |
| 6,103,949 A | 8/2000 | Demmel et al. | |
| 6,264,881 B1 | 7/2001 | Plee | |
| 6,610,625 B1 | 8/2003 | McCauley | |
| 2002/0009404 A1 | 1/2002 | Tsybulevskiy et al. | |

FOREIGN PATENT DOCUMENTS

| | | |
|---|---|---|
| DE | 3705624 A1 | 9/1988 |
| EP | 0403141 A1 | 12/1990 |
| EP | 0503876 A1 | 9/1992 |
| EP | 0511885 A1 | 11/1992 |
| EP | 0541101 A1 | 5/1993 |
| EP | 0781832 A1 | 7/1997 |
| WO | WO 96/03199 | 2/1996 |
| WO | WO 00/71249 A1 | 11/2000 |

OTHER PUBLICATIONS

Gimadeev, L.N. et al., Activity and Stability of Zelolites In Adsorption of Ethyl Mercaptan, 1985, p. 34 (English Abstract Included).
Ziolek, Maria et al., Adsorption and Transformation of Sulphur Compounds on Zeolites, 1996, pp. 67-73, Faculty of Chemistry, A. Micklewicz University, Poland.
XP-002265290—M. Ziolek and P. Decyk, *Relation Between Chemisorption and Catalytic Transformation of $R_2S$ Compounds on Faujasite-Type Zeolites*, A. Mickiewicz University, Faculty of Chemistry, Langmuir 1999, vol. 15, No. 18 (Aug. 31), pp. 5781-5784, 1999 American Chemical Society.
XP-002265291—Natural Gas Proc. In., SU 1274746A, Class H01, AN 1987-220075, Dec. 7, 1986, abstract.
XP-002265292—Lin K, WO 0067898, Class H04, AN 2000-687626, Nov. 16, 2000, abstract.
XP-002276682—Volgo-Ural Hydrogen, SU 1611859A, Class H01, AN 1991-244298, Dec. 7, 1990, abstract.

* cited by examiner

*Primary Examiner*—Frank M Lawrence
(74) *Attorney, Agent, or Firm*—Banner & Witcoff, Ltd.

(57) ABSTRACT

A desorption process and a process for producing a catalytically deactivated formed zeolitic adsorbent, whereby both processes are suitable to improve the lifetime of a formed zeolitic adsorbent in the removal of sulfur compounds from sulfur contaminated gas and liquid feed streams. The adsorbent is in particular a synthetic 13X or LSX faujasite with a silica to alumina ratio from 1.9:1.0 to about 3.0:1.0. The cations of the faujasite include alkali and alkaline earth metals. The formed zeolite mixture is preferably catalytically deactivated due to a phosphate treatment. The desorption is carried out thermally, wherein the heat treatment is done at different temperature stages to avoid decomposition of the organic sulfur compounds.

32 Claims, 4 Drawing Sheets

METHOD FOR SULFUR COMPOUNDS REMOVAL FROM CONTAMINATED GAS AND LIQUID STREAMS

TECHNICAL FIELD

The present invention relates to a novel adsorption process for removal of sulfur compounds, including mercaptans, sulfides, disulfides, thiophenes and thiophanes from liquid and gas feed streams, and more particularly, an adsorption process for purification of hydrocarbons, petroleum distillates, natural gas and natural gas liquids, associated and refinery gases. The process is characterized in using a modified faujasite type zeolite adsorbent and/or a dedicated way to regenerate the adsorbent to avoid decomposition and coking of the adsorbed sulfur compounds.

BACKGROUND ART

Most organo-sulfur compounds possess a strong and unpleasant odor. Thus, gases and liquids, which contain even a very small amount of these compounds, have a bad smell. For some applications, as for city gas, this is a desired side effect to avoid hazardous situations, but in most cases, sulfur compounds are troublesome impurities that need to be removed. Owing to this problem, the technology-of removing these substances is conventionally termed as "sweetening" or deodorization. These sulfur-contaminated compounds are also corrosive, causing damage to technological equipment and transportation systems. Further, practically all sulfur-contaminated compounds are irreversible poisons for many catalysts used in chemical processes. Therefore, such commercially important processes as natural gas steam reforming, individual hydrocarbons and petroleum distillate isomerisation, hydrogenation, etc. require practically complete removal of the many sulfur compounds from the process feed before catalysis. Finally, it should be mentioned, that the full oxidation of the organic sulfur compounds leads to sulfur dioxide and sulfur trioxide, whose formation needs to be minimized for ecological reasons.

Removal of sulfur containing compounds is normally done in two steps. In a first stage, the amine treatment removes hydrogen sulfide from the system. Some mercaptans, part of carbon oxysulfide and of carbon dioxide may also be removed in this step. This process is related to absorption. The second step is an adsorption of organic sulfur compounds, especially mercaptans, sulfides, thiophenes, thiophanes and disulfides.

Adsorption of sulfur-contaminated compounds is the most common method for removal of these sulfur compounds, because of the high performance and relatively low capital and operational costs. Numerous processes and adsorbents have been developed for the removal of organic sulfur compounds and hydrogen sulfide, carbon oxysulfide and carbon disulfide, from gases and liquids.

The most widely used physical adsorbents for these sulfur compounds are synthetic zeolites or molecular sieves. For example, U.S. Pat. No. 2,882,243 and U.S. Pat. No. 2,882,244 disclose an enhanced adsorption capacity of molecular sieves NaA, CaA, and MgA for hydrogen sulfide at ambient temperatures. U.S. Pat. No. 3,760,029 discloses the use of synthetic faujasites as an adsorbent for dimethyl disulfide removal from n-alkanes. U.S. Pat. No. 3,816,975, U.S. Pat. No. 4,540,842 and U.S. Pat. No. 4,795,545 disclose the use of standard molecular sieve 13X as a sulfur adsorbent for the purification of liquid hydrocarbon feedstocks. For removal of carbonyl sulfide, mercaptans, and other sulfur compounds from liquid n-alkanes, U.S. Pat. No. 4,098,684 discloses the use of combined beds of molecular sieves 13X and 4A. EP 0 781 832 discloses zeolites of types A, X, Y and MFI as adsorbents for hydrogen sulfide and tetrahydrothiophene in natural gas feed streams.

Regeneration of these molecular sieves is possible at elevated temperatures. To facilitate regeneration of the molecular sieves by removing the sulfur compounds adsorbed, the use of cation exchanged forms of zeolite types A, X, Y have been proposed due to their catalytic activity in the reduction or oxidation reaction of sulfur compounds at the regeneration stage. For instance, U.S. Pat. No. 4,358,297 discloses regeneration of the adsorbent using hydrogen or a hydrogen-contaminated stream at elevated temperatures, 200-650° C., resulting in conversion of the organo-sulfur compounds to hydrogen sulfide. U.S. Pat. No. 5,843,300 discloses a regenerable adsorbent for gasoline purification that comprised a standard zeolite X impregnated with up to 1% by weight zero valent platinum or palladium. This noble metal component provides hydrogenation of the adsorbed organic sulfur compounds on the course of the adsorbent regeneration. However, the introduction of noble metals into the adsorbent composition substantially increases the cost of the adsorbent.

During adsorption and especially during desorption, the mercaptans undergo chemical transformations. The mercaptans may form sulfides, disulfides or alkenes and hydrogen sulfide according equation (1), (2) and (3). This phenomenon is described in detail in K.-H. Bergk, F. Wolf, Z. Chem. 1974, 14(9), 344-349.

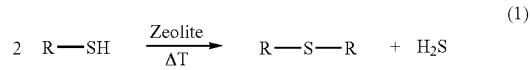

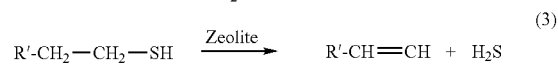

The alkenes are unstable under the regeneration conditions and tend to oligomerise and ultimately will lead to coke formation in the zeolite pores. L. N. Gimadeev et al., Gazov Prom-st 1985, 9, p. 34 describe that at a regeneration temperature of 350° C. after a few adsorption cycles, the coke formation will reduce the adsorption capacity dramatically.

Ziolek et al., Pr. Nauk. Inst. Chem. Technol. Nafty Weg 1996, 55(8), 67-73 discuss the influence of Bronsted acid, Lewis acid and/or basic sites on the zeolite surface to the catalytic decomposition of mercaptans during regeneration. However, they fail to teach on how to deactivate such centers on a zeolite.

All these molecular sieve adsorbents can work at ambient temperature and have a substantial capacity for removal of sulfur compounds at relatively high concentrations. While all these products have been useful for gas and liquid stream purification of sulfur-contaminated compounds, they need special arrangements to get full regeneration.

It is a main aspect of the present invention to enhance the lifetime of zeolitic adsorbents, in particular by providing improved adsorbents and processes which do not have the disadvantages of the regeneration mentioned above. Accordingly, it is an aspect of the invention to provide an adsorbent and a process for purification of sulfur-contaminated feed streams with improved regeneration capabilities.

It is a further aspect of the invention to provide a low cost adsorbent for sulfur compounds.

It is a further aspect of the invention to provide an improved process for regeneration of the molecular sieve.

It is still a further aspect of the invention to disclose an adsorbent with capability to purify feed streams of practically all organo-sulfur compounds, including thiols (mercaptans), sulfides, disulfides, thiophenes, thiophanes, etc. as well as hydrogen sulfide, carbon oxysulfide, and carbon disulfide, individually or in combination thereof.

These and further aspects of the invention will be apparent from the description of the invention, and in particular of the preferred embodiments thereof.

DISCLOSURE OF THE INVENTION

Typical sour natural gas treatment consists of the following steps.
 1. Slug catching to separate liquid and gas phases
 2. Amine treatment to remove hydrogen sulfide. Some mercaptans and carbon dioxide and carbon oxysulfide may also be removed in this step.
 3. Treatment with an adsorbent, e.g. molecular sieve to remove mercaptans and moisture
 4. Cryogenic treatment to recover hydrocarbons.

The present invention concentrates on step 3. above. It provides an improved adsorption/desorption step, whereby this improvement is obtained by
 (i) a specific adsorbent or
 (ii) a process for removing sulfur compounds from sulfur contaminated gas and liquid streams which exhibits enhanced adsorption capacity and easier regeneration over an enhanced number of cycles, over a broad range of sulfur compound concentrations and over a broad range of temperatures, or, preferably,
 (iii) a combination of (i) and (ii).

The inventive adsorbent comprises faujasites, in particular synthetic zeolite 13X or LSX faujasites, wherein the silica to alumina ratio is from about 1.9:1.0 to about 3.0:1.0, preferably from about 2.0:1.0 to about 2.5:1.0, and wherein exchangeable cations are introduced into the synthetic faujasite structure including the alkali and alkaline earth groups of the periodic table. In improvement (i), the formed zeolitic material is catalytically deactivated by treatment with phosphates by a-process comprising the following steps
 a) mixing of at least one faujasite zeolite powder, in particular a zeolite 13X powder or a zeolite LSX powder, with a clay type binder, an inorganic phosphorous salt, water and, optionally, with an organic additive
 b) production of a formed zeolitic body out of the mixture of step a), and
 c) drying and calcination of said zeolitic body produced in step b) to fix the binder and to get the active adsorption reagent.

The present invention also relates to a process for purifying gas and liquid streams contaminated with organic sulfur compounds which comprises passing said gas and liquid feed streams over an adsorbent at a temperature from about 10 to about 60° C. and regenerating said adsorbent in a gas flow at a temperature from about 150 to about 320° C., wherein the temperature profile of the regeneration or desorption, respectively, is chosen the way that a reduced amount of unremovable sulfur containing side products compared to usual methods, i.e. methods with fast heating to final "desorption" temperature, are generated.

The desorption processes of the present invention are in particular performed such that the desorption/regeneration is done by a heating profile allowing the organic sulfur compounds to reach their equilibrium adsorption capacity at each temperature.

Such an equilibrium can be achieved at least to an improved (or undesired side products reducing) extent if the desorption is done by fast heating to a basic temperature of at most 200° C., preferably 100 to 150° C., in particular about 150° C., and then using a temperature halt at different temperature levels starting at the basic temperature, or if the desorption is done by fast heating to a basic temperature of at most 200° C., preferably 100 to 150° C., in particular about 150° C., and then heating using a small temperature increase rate at temperature levels above the basic temperature.

MODES FOR CARRYING OUT THE INVENTION

Figure 1:
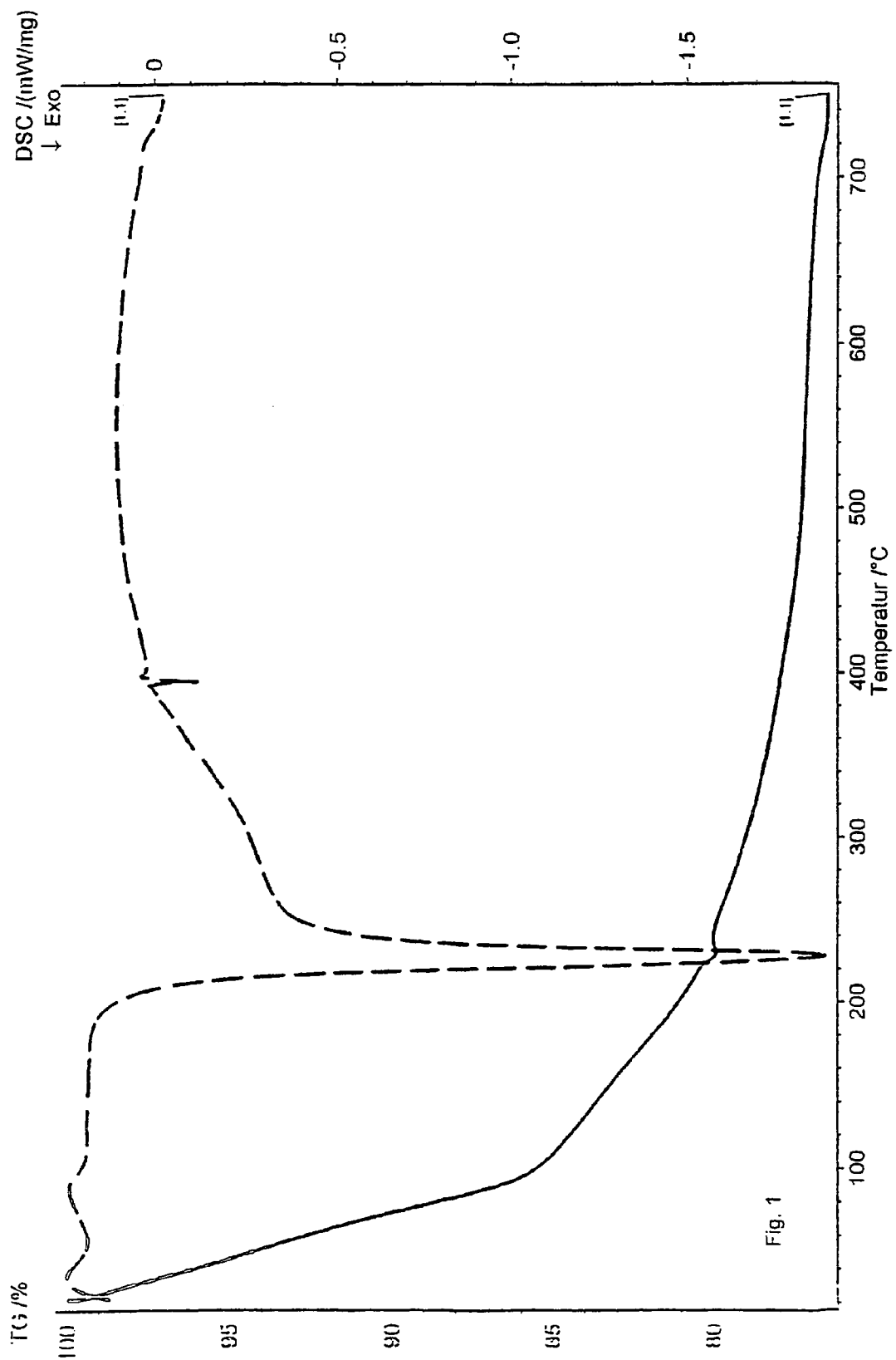
FIG. 1: A beaded molecular sieve 13X, fully adsorbed with ethyl mercaptan, was desorbed in a TGA instrument, using a temperature increase of 5° C./min. This experiment was carried out in ambient air. The curve shows the weight loss (solid line) and the DSC curve (dotted line).

Synthetic faujasites with silica to alumina ratio of 1.9:1.0 to 3.0:1.0 have previously been developed for the adsorption of sulfur-contaminated compounds from-gas and liquid feed streams. In an attempt to improve these conventional faujasites, the sodium cations present have been substituted for by other metal ions having larger size. However, contrary to the intended improvement, it was found that such substitutions generally decrease the adsorption capacity of the faujasites for sulfur-containing organic compounds. For example, it is known that the potassium and calcium forms of faujasite X type adsorbents are characterized by substantially lower adsorption capacity for alkyl mercaptans and hydrogen sulfide than the sodium form of the same faujasite X. Nevertheless, zeolites in the calcium form, in particular a formed zeolite that is between 60 and 95% in its calcium form, and zeolites with high potassium content can be used. All of these zeolites can be regenerated at elevated temperatures, but all of them form substantial amounts of oligomers and coke and thus lead to a decrease of adsorption capacity for the forthcoming adsorption cycles.

The purification of a gas stream typically occurs in a fixed bed of the adsorbent at temperatures from about 10 to about 60° C., pressures from atmospheric to about 12 Mpa (120 bars) and gas flow linear velocities through the adsorbent bed from about 0.03 to about 0.35 m/sec. The thermal regeneration of the adsorbent, when loaded with sulfur compounds, is performed in a purified and dried gas flow at temperatures preferably from about 180 to about 320° C., the regeneration can occur shortly after sulfur compound breakthrough of the adsorbent bed.

It has been surprisingly found that formation of sulfur compound side products and thus deactivation of the formed molecular sieve can be substantially decreased by two independent but complementary process changes.

The first improvement being part of the invention is dealing with the deactivation of the molecular sieve to avoid formation of sulfur compound side products. Bronsted or Lewis acid sites on the formed molecular sieve are assumed to catalyze the transformation of mercaptans into sulfides, disulfides, alkenes, etc. It has now been found that adding a phosphate to the forming process leads to a deactivation of the molecular sieve. The phosphate leads to a masking of the catalytically active centers in the clay binder and in the zeolite system. The masking according to the invention has been found to be strong enough to survive several adsorption/desorption cycles. Without wanting to be restricted to a specific theory, it seems that the phosphate eliminates to some extent the Bronsted and/or Lewis acid sites in the molecular sieve.

A formed zeolite for adsorption purposes with improved adsorption and desorption properties for sulfur compounds can be produced by a process comprising the following steps a) mixing of at least one faujasite zeolite powder, in particular a zeolite 13X powder or a zeolite LSX powder, with a clay type binder, an inorganic phosphorous salt, water and, optionally, with an organic additive b) production of a formed zeolitic body out of the mixture of step a), and c) drying and calcination of said zeolitic body produced in step b) to fix the binder and to get the active adsorption reagent.

If desired, after step c) a step of ion exchange can be provided.

The zeolites used in step a), in particular the zeolite 13X and/or LSX faujasites, can be produced according to known methods, optionally followed-by a step of ion exchange.

The inorganic phosphorous salt used in step a) usually is a water soluble phosphorous salt, preferably a salt selected from the group comprising tetrasodium diphosphate, tetrasodium polyphosphate, trisodium phosphate, disodium hydrogen phosphate, sodium dihydrogen phosphate, tripotassium phosphate, dipotassium hydrogen phosphate, potassium dihydrogen phosphate or a mixture of two or more of said salts.

The amount of inorganic phosphorous salt in general is between 0.3 and 5.0 weight percent based on the formed body weight, preferably between 0.3 and 3.0 weight percent based on the formed body weight.

The amount of clay binder usually is between 5 and 30 weight percent of the formed body weight, preferably between 5 and 20 weight percent of the formed body weight.

Although a zeolite that is between 60 and 95% in its calcium form can be applied in the sulfur compound adsorption process, it is preferred that the zeolite is at least 70% in its sodium form, preferably at least 90%. Other exchangeable cations, such as alkaline or alkaline earth cations, may be used before step a) to produce a zeolite with the desired cation composition. The zeolite is subjected to an ion exchange after the usual preparation procedure. Alternatively, the ion exchange is done after step c) of the forming and calcination process to give the desired cation composition.

In step a) usually an organic-additive such as preferably a pore forming agent is added, in particular a pore forming agent selected from the group consisting of rayon fibers, nylon fibers, sisal fibers and flax, as well as organic polymers, such as starch, starch derivatives, ligninsulfonates, polyacrylamides, polyacrylic acids, cellulose and cellulose derivatives.

The pore forming agent usually amounts to 2 to 15 weight percent based on the formed body weight.

The use of zeolites obtainable according to the method described above in conventional adsorption/desorption processes for the removal of sulfur compounds, and in particular in adsorption/desorption processes that are also part of the present invention, are further aspects of the present invention.

A process applying such zeolites to remove by adsorption one or more low molecular weight organic sulfur compounds from a gaseous or liquid stream, comprises the step of passing the feed stream through a bed of formed zeolitic molecular sieve obtainable according to the present invention.

Usually removed organic sulfur compounds are one or more low molecular weight mercaptans or sulfides.

A preferred adsorption temperature is at most 60° C.

The second improvement being part of the invention is dealing with the regeneration of the molecular sieve, again with the goal to suppress the formation of sulfur compound side products, such as alkenes, sulfides, disulfides, oligomers and coke.

During the conventional thermal regeneration process, a number of side products are formed that are not easily desorbed from the molecular sieve. Especially at higher temperatures, these products will undergo further reactions and ultimately will lead to coke formation. For example, mercaptans are oxidized to sulfides, disulfides and/or polysulfides. These newly formed sulfur compounds are then adsorbed more strongly to the synthetic faujasite, due to their higher molecular weight, thereby reducing the adsorbent capacity of the faujasite.

TGA and DSC measurements revealed that the formation of side products takes place above 200° C. It has been surprisingly found that the degradation of the mercaptans can be reduced remarkably, if temperature increase is done stepwise with a halt step at different levels. In one successful experiment, the temperature was increased in steps of 10° C. at a time and the temperature was left unchanged for 30 minutes before it was increased by another 10° C. Using this approach, no exothermic reaction could be observed, indicating that no degradation of the mercaptans took place.

To avoid the formation of side products of the sulfur compounds, in the inventive process that is applicable from low scale (i.e. gram scale) to large scale, the regeneration temperature is not set at its maximum temperature from the very beginning, but—after having reached a basic temperature—is increased either stepwise or with a continuous temperature ramp with a slow increase in temperature. The temperature increase should be performed such that the organic sulfur compounds reach their equilibrium adsorption capacity at each temperature. The regeneration agent used may be any non oxidizing gas such as natural gas, methane, ethane, nitrogen, hydrogen, or evaporated hydrocarbons.

In the desorption process of the present invention for the desorption of organic sulfur compounds from a formed faujasite zeolite, in particular formed zeolite 13X or formed zeolite LSX, or a mixture-of formed zeolite 13X and formed zeolite LSX, the desorption is done by fast heating to a basic temperature of at most 200° C., preferably 100 to 150° C., in particular about 150° C., and then using a temperature halt at different temperature levels starting at the basic temperature.

The halt time preferably is at least 10 minutes at each temperature level, and—also preferably—the temperature levels are at least 5° C. and at most 50° C. apart from each other.

In another procedure of the present invention, the desorption process of organic sulfur compounds from a formed faujasite zeolite is done by fast heating to a basic temperature of at most 200° C., preferably 100 to 150° C., in particular about 150° C., and then heating using a small temperature increase rate at temperature levels above the basic temperature.

A preferred temperature increase rate is less than 3° C./min. The maximum regeneration temperature preferably is about 320° C.

It is also within the scope of the present invention to apply a temperature profile with smaller temperature increase rate than described above and shorter halting times than described above such that an average temperature increase rate similar to the temperature increase rate of the two above described procedures results.

As already mentioned above, the preferred zeolite for use in the inventive desorption methods is a zeolite obtainable according to the deactivation method described in the first aspect of the present invention.

In order to illustrate the present invention and the advantages thereof, the following examples are provided. It is understood that these examples are illustrative and do not provide any limitation on the invention.

EXAMPLES

Example 1

According to the Invention 2250 g of zeolite 13X filter cake, obtained from Zeochem AG, Uetikon, Switzerland, which had a moisture content of 25%, was mixed with 320 g (dry base) of an attapulgite binder and 25 g of tetrasodium diphosphate. This mixture was moistened further with water and mixed in a laboratory scale Eirich mixer R02 to get zeolite beads. The green beads were sieved to a fraction of 1.6-2.6 mm, dried at 100° C. and then calcined at 620° C. for one hour. The calcined material was cooled to room temperature and then stored in an air tight container.

Example 2

Prior Art

A sample of about 2 g of commercially available beaded molecular sieve 13X (Zeochem AG, Uetikon, Switzerland; brand name molecular sieve Z10-03) was put in a desiccator and loaded with ethyl mercaptan at a temperature of 25° C. The fully loaded molecular sieve was put in a small alumina crucible of a TGA instrument and the temperature programmed desorption was recorded. At the same time the energy flow was determined and the DSC curve recorded.

The desorption was done under ambient air and with a temperature increase of 5° C./min. A strong exothermic reaction was observed at about 225° C., indicating that the mercaptan undergoes a degradation reaction. The result is also shown in FIG. 1.

Example 3

Prior Art

Figure 2:
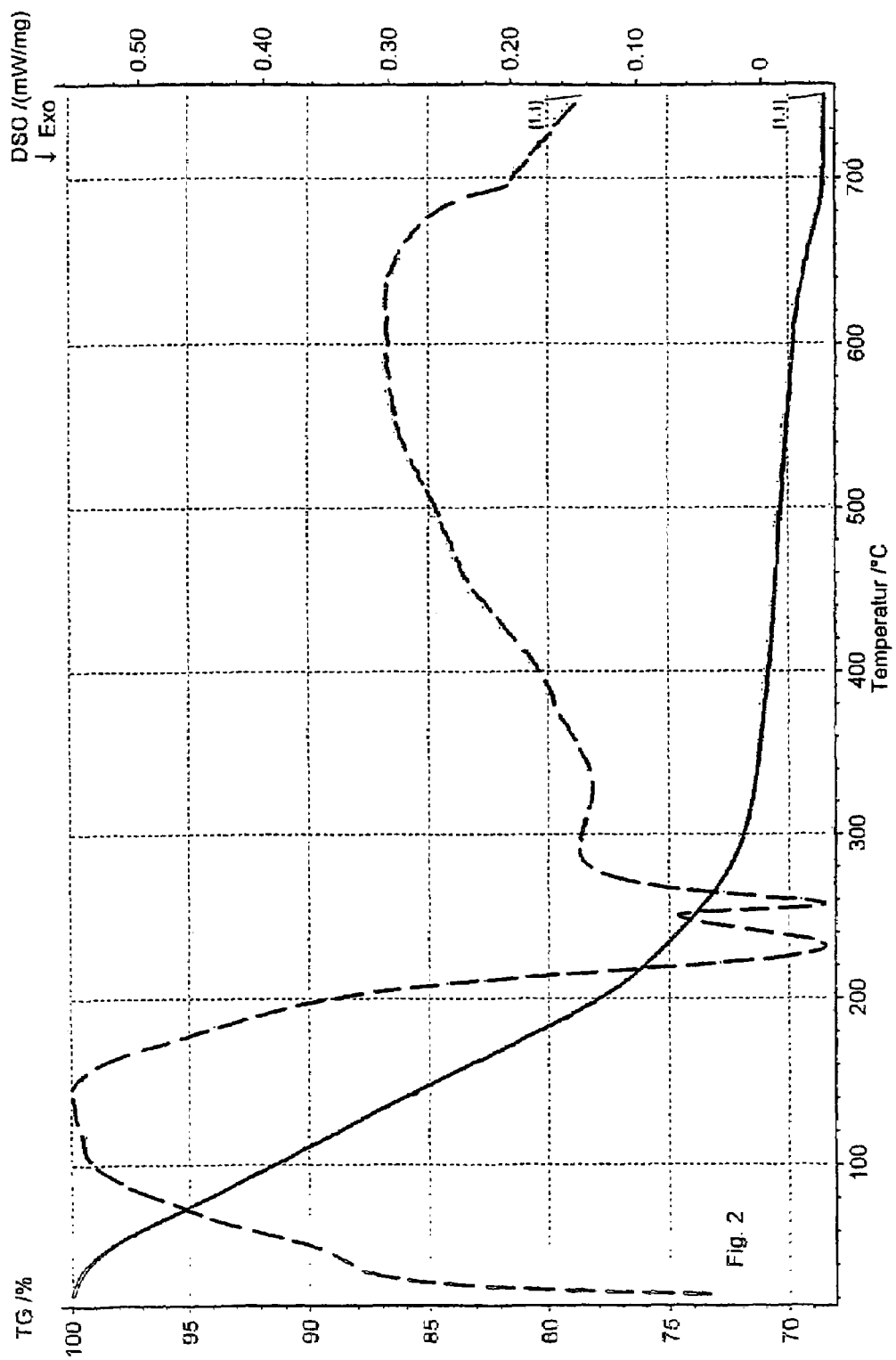
FIG. 2: A beaded molecular sieve 13X, fully adsorbed with ethyl mercaptan, was desorbed in a TGA instrument, using a temperature increase of 5° C./min. The carrier gas used for this experiment was purified nitrogen. The curve shows the weight loss (solid line) and the DSC curve (dotted line).

As example 2, but the desorption was done with nitrogen as a desorption gas and with a temperature increase of 5° C./min. An exothermic reaction was observed at 220-250° C. The result is also shown in FIG. 2.

Example 4

According to the Invention

A sample of about 2 g of the zeolite synthesized in example 1 was put in a desiccator and loaded with ethyl mercaptan at a temperature of 25° C. The fully loaded molecular sieve was put in a small alumina crucible of a TGA instrument and the temperature programmed desorption was recorded. At the same time the energy flow was determined and the DSC curve recorded.

Figure 3:
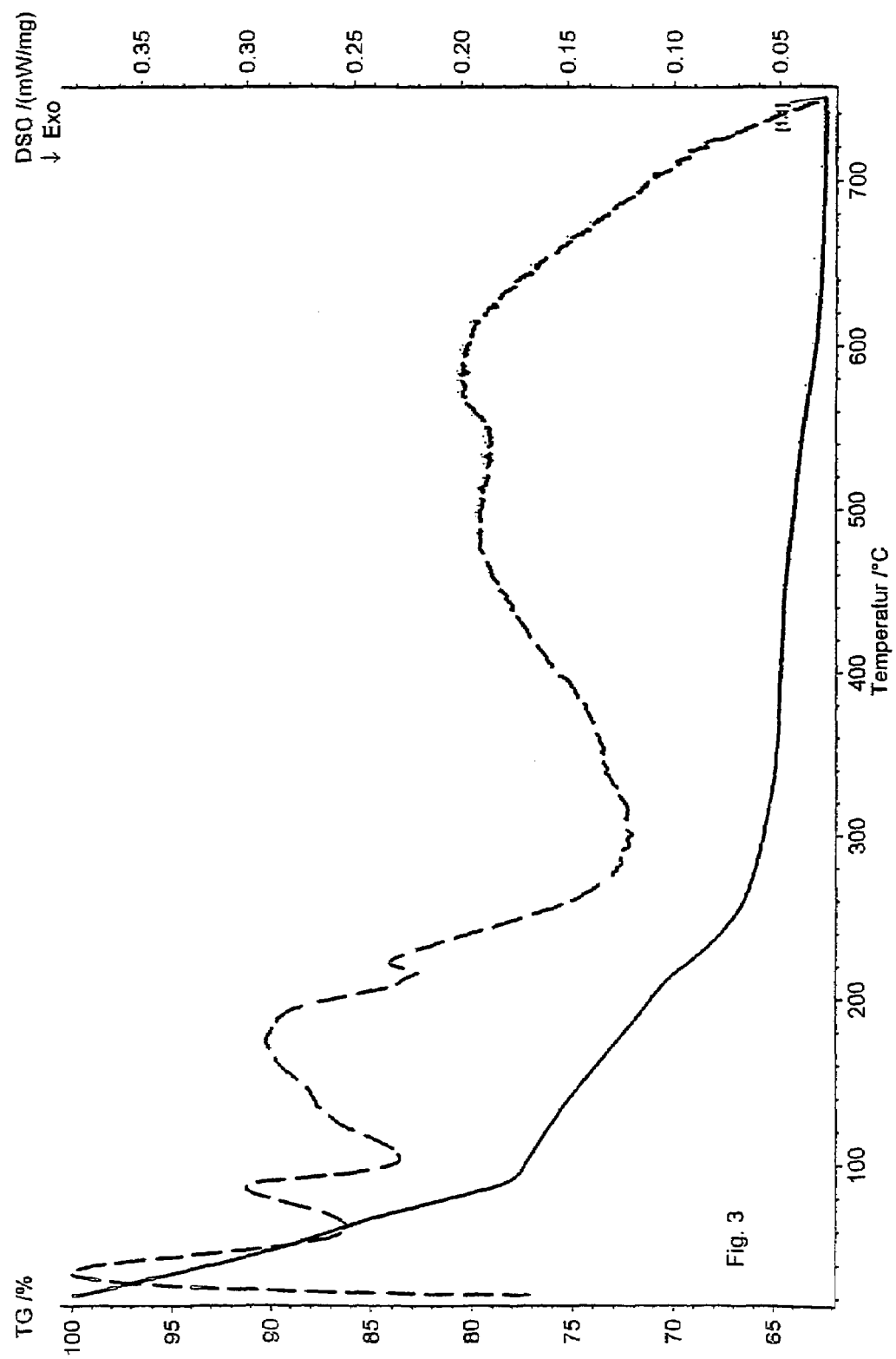
FIG. 3: A beaded molecular sieve 13X, deactivated with phosphate, and fully adsorbed with ethyl mercaptan, was desorbed in a TGA instrument, using a temperature increase of 5° C./min. The carrier gas used for this experiment was purified nitrogen. The curve shows the weight loss (solid line) and the DSC curve (dotted line).

The desorption was done with nitrogen as a desorption gas and with a temperature increase of 5° C./min. No exothermic reaction was observed over the whole temperature range of desorption. The result is also shown in FIG. 3.

Example 5

According to the Invention

A sample of about 2 g of commercially available beaded molecular sieve 13X (Zeochem AG, Uetikon, Switzerland; brand name molecular sieve Z10-03) was put in a desiccator and loaded with propyl mercaptan at a temperature of 25° C. The fully loaded molecular sieve was put in a small alumina crucible of a TGA instrument and the temperature programmed desorption was recorded. At the same time the energy flow was determined and the DSC curve recorded.

Figure 4:
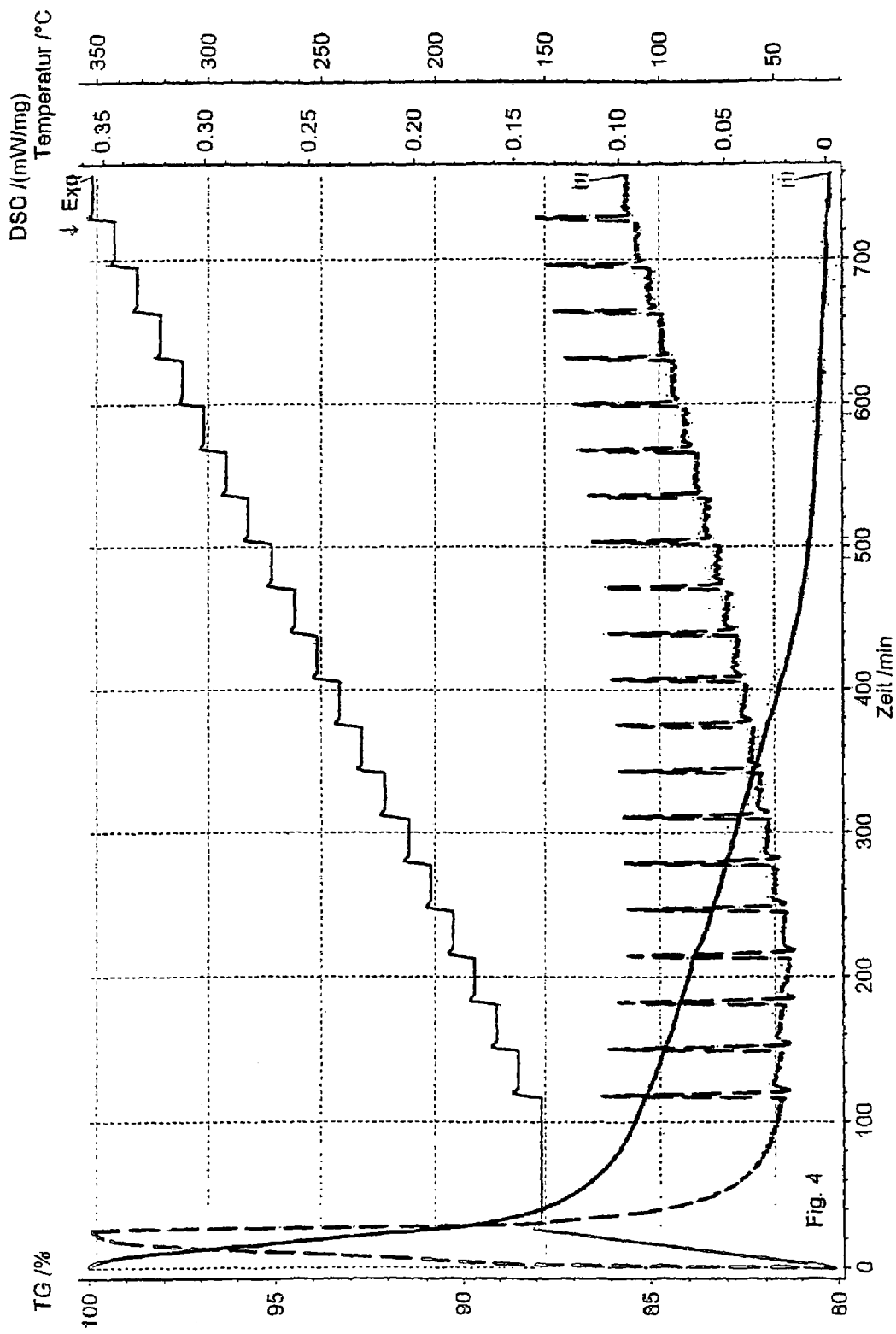
FIG. 4: A beaded molecular sieve 13X, not deactivated with phosphate, but fully adsorbed with propyl mercaptan, was desorbed in a TGA instrument, using a temperature increase of 5° C./min. up to 150° C. The halting time at this temperature was 90 minutes. Higher temperatures were achieved in time intervals of 30 minutes and temperature intervals of 10° C. The carrier gas used for this experiment was purified nitrogen. The curve shows the weight loss (solid line) and the DSC curve (dotted line), and the temperature profile (fine line).

The desorption was done with nitrogen as a desorption gas. Up to 150° C., the heating was done at a pace of 5° C./min., then a halting time of 90 min. was introduced. After that, the heating was done stepwise with temperature increases of 10° C. and a halting time of 30 min. at each temperature. The desorption of propyl mercaptan went very smoothly, and no exothermic reaction was observed. The result is also shown in FIG. 4.

While there are shown and described presently preferred embodiments of the invention, it is to be distinctly understood that the invention is not limited thereto but may be otherwise variously embodied and practiced within the scope of the following claims.

The invention claimed is:

1. A process to produce a formed zeolite for adsorption purposes with improved adsorption and desorption properties comprising the following steps
   a) mixing of at least one faujasite zeolite powder with a clay type binder, an inorganic phosphorous salt, and water, the faujasite zeolite powder selected from the group consisting of zeolite 13X powder and a zeolite LSX powder, and combinations thereof,
   b) producing a formed zeolitic body out of the mixture of step a), and
   c) drying and calcination of said zeolitic body produced in step b) to fix the binder and to get an adsorption reagent.

2. The process of claim 1, comprising after step c) a step of ion exchange.

3. The process of claim 1, wherein the amount of clay binder is between 5 and 30 weight percent based on the formed zeolitic body.

4. The process of claim 1, wherein the amount of clay binder is between 5 and 20 weight percent of the formed zeolitic body.

5. The process of claim 1, wherein the zeolite powder is at least 70% in its sodium form.

6. The process of claim 1, wherein the zeolite powder is at least 90% in its sodium form.

7. The process of claim 1, wherein the zeolite powder is at maximum 30 % in its potassium form.

8. The process of claim 1, wherein a pore forming agent is added to the zeolite and binder mixture, the pore forming agent selected from the group consisting of rayon fibers, nylon fibers, sisal fibers, flax, and organic polymers selected from the group consisting of starch, starch derivatives, ligninsulfonates, polyacrylamides, polyacrylic acids, cellulose and cellulose derivatives.

9. The process claim 8, wherein the pore forming agent amounts to 2 to 15 weight percent of the formed zeolitic body.

10. The process of claim 1, wherein the inorganic phosphorous salt used in step a) is a phosphorous salt selected from the group consisting of tetrasodium diphosphate, tetrasodium polyphosphate, trisodium phosphate, disodium hydrogen phosphate, sodium dihydrogen phosphate, tripotassium phosphate, dipotassium hydrogen phosphate, and potassium dihydrogen phosphate or a mixture of two or more of said phosphorous salts.

11. The process of claim 1, wherein the amount of inorganic phosphorous salt is between 0.3 and 5.0 weight percent of the formed zeolitic body.

12. The process of claim 1, wherein the amount of inorganic phosphorous salt is between 0.3 and 3.0 weight percent of the formed zeolitic body.

13. An adsorption reagent obtainable according to the process of claim 1.

14. A process to remove by adsorption one or more low molecular weight organic sulfur compounds from a gaseous or liquid stream, wherein the feed stream is passed through a bed of adsorption reagent produced by the method according to claim 1.

15. The process of claim 14, wherein the organic sulfur compounds are one or more low molecular weight mercaptans or sulfides.

16. The process of claim 14, wherein the process to remove by adsorption is carried out with an adsorption temperature of 60° C. or lower.

17. A desorption process for the desorption of organic sulfur compounds from the adsorption reagent obtainable according to the process of claim 1, wherein the desorption is done by heating using a heating profile allowing the organic sulfur compounds to reach their equilibrium adsorption capacity at each temperature.

18. A desorption process, for the desorption of organic sulfur compounds from the adsorption reagent obtainable according to the process of claim 1, wherein the desorption is done by fast heating to a basic temperature of at most 200° C., and then using a temperature halt at different temperature levels starting at the basic temperature.

19. A desorption process according to claim 18, wherein the halt time is at least 10 minutes at each temperature level.

20. A desorption process according to claim 18, wherein the temperature levels are at least 5° C. and at most 50° C. apart from each other.

21. A desorption process according to claim 17, wherein the desorption is done by fast heating to a basic temperature of at most 200° C., and then heating using a temperature increase of less than 3° C. per minute above the basic temperature.

22. The desorption process according to claim 17, wherein the heating profile has a maximum temperature of at most about 320° C.

23. The desorption process according to claim 17, wherein the maximum regeneration temperature is about 320° C.

24. The desorption process according to claim 17, wherein the adsorption reagent is regenerated to its active adsorption state using a regeneration material selected from the group consisting of dry natural gas, methane, liquefied natural gas, hydrogen, nitrogen and hydrocarbons.

25. The desorption process according to claim 21, wherein the adsorption reagent is regenerated to its active adsorption state using a regeneration material selected from the group consisting of dry natural gas, methane, liquefied natural gas, hydrogen, nitrogen, and hydrocarbons.

26. The process of claim 1, wherein step a) includes the step of mixing an organic additive with the other materials mixed in step a).

27. The process of claim 15, wherein the process to remove by adsorption is carried out with an adsorption temperature of 60° C. or lower.

28. A desorption process according to claim 18 wherein the desorption is done by fast heating to a basic temperature in the range of about 100° C. to 150° C.

29. A desorption process according to claim 18, wherein the desorption is done by fast heating to a basic temperature of about 150° C.

30. A desorption process according to claim 19, wherein the temperature levels are at least 5° C. and at most 50° C. apart from each other.

31. A desorption process according to claim 21, wherein the desorption is done by fast heating to a basic temperature in the range of about 100° C. to 150° C.

32. A desorption process according to claim 21, wherein the desorption process is done by fast heating to a basic temperature of about 150° C.

* * * * *

UNITED STATES PATENT AND TRADEMARK OFFICE
CERTIFICATE OF CORRECTION

PATENT NO. : 7,651,550 B2
APPLICATION NO. : 10/559734
DATED : January 26, 2010
INVENTOR(S) : Hawes et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 651 days.

Signed and Sealed this

Twenty-eighth Day of December, 2010

David J. Kappos
*Director of the United States Patent and Trademark Office*